United States Patent
Teune et al.

(10) Patent No.: US 9,212,889 B2
(45) Date of Patent: Dec. 15, 2015

(54) APPARATUS FOR POINTING SPATIAL COORDINATES, COMPRISING A MOVABLE HAND-HELD PROBE AND A PORTABLE BASE UNIT, AND A RELATED METHOD

(71) Applicant: HOLDING PRODIM SYSTEMS B. V., Helmond (NL)

(72) Inventors: Rene Teune, Helmond (NL); Antonius Johannes Janssen, Helmond (NL)

(73) Assignee: HOLDING PRODIM SYSTEMS B.V., Helmond (NL)

( * ) Notice: Subject to any disclaimer, the term of this patent is extended or adjusted under 35 U.S.C. 154(b) by 111 days.

(21) Appl. No.: 13/788,211

(22) Filed: Mar. 7, 2013

(65) Prior Publication Data
US 2013/0232804 A1    Sep. 12, 2013

(30) Foreign Application Priority Data
Mar. 8, 2012    (NL) ..................................... 2008435

(51) Int. Cl.
| | | |
|---|---|---|
| *G01B 5/004* | (2006.01) | |
| *G01B 5/008* | (2006.01) | |
| G01B 7/004 | (2006.01) | |
| G01C 15/00 | (2006.01) | |
| G01B 13/00 | (2006.01) | |
| G01B 13/14 | (2006.01) | |
| G01B 21/04 | (2006.01) | |

(52) U.S. Cl.
CPC ................ *G01B 5/008* (2013.01); *G01B 5/004* (2013.01); *G01B 21/04* (2013.01); *G01B 21/045* (2013.01); *G01B 21/047* (2013.01)

(58) Field of Classification Search
CPC ...... G01B 5/008; G01B 21/04; G01B 21/045; G01B 21/047; G01B 5/004
USPC .............................. 33/503, 1 CC, 1 LE, 1 BB
See application file for complete search history.

(56) References Cited

U.S. PATENT DOCUMENTS

| | | | | |
|---|---|---|---|---|
| 4,249,314 | A * | 2/1981 | Beck ................................ | 33/1 H |
| 4,691,446 | A * | 9/1987 | Pitches et al. ................... | 33/516 |
| 5,675,514 | A | 10/1997 | Lefebvre | |
| 6,785,973 | B1 * | 9/2004 | Janssen ........................... | 33/1 N |
| 2004/0187332 | A1 * | 9/2004 | Kikuchi et al. ................. | 33/503 |
| 2008/0271332 | A1 * | 11/2008 | Jordil et al. ..................... | 33/503 |
| 2010/0198543 | A1 * | 8/2010 | Teune ............................. | 702/95 |
| 2012/0251991 | A1 * | 10/2012 | Savitsky et al. ............... | 434/262 |

FOREIGN PATENT DOCUMENTS

| | | |
|---|---|---|
| JP | 2010-223754 | 10/2010 |
| NL | 1036517 | 8/2010 |

OTHER PUBLICATIONS

Search Report issued in NL application No. 2008435 (2012).

* cited by examiner

*Primary Examiner* — Laura Martin
*Assistant Examiner* — Rhyan C Lange
(74) *Attorney, Agent, or Firm* — Barnes & Thorburg LLP; Mark J. Nahnsen

(57) ABSTRACT

An apparatus for pointing spatial coordinates, comprising a movable hand-held probe, having a pointing tip, and a portable base unit provided with a rotatably supported elongated arm, wherein the hand-held probe connects to the portable base unit by means of a cord or a wire via the elongated arm and wherein the base unit is provided with sensors for measuring length or a change in length of the cord or the wire and rotation of the arm in at least one degree of freedom, and computer-controlled processing means for processing measuring signals delivered by the sensors into position data of the hand-held probe.

18 Claims, 5 Drawing Sheets

APPARATUS FOR POINTING SPATIAL COORDINATES, COMPRISING A MOVABLE HAND-HELD PROBE AND A PORTABLE BASE UNIT, AND A RELATED METHOD

CROSS REFERENCE TO RELATED APPLICATIONS

This application claims priority to Netherlands patent application no. 2008435, filed Mar. 8, 2012, the content of which is incorporated herein by reference in its entirety.

BACKGROUND

The invention relates to an apparatus for pointing spatial coordinates, comprising a movable hand-held probe, having a pointing tip, and a portable base unit provided with a rotatably supported elongated arm, wherein the hand-held probe connects to the portable base unit by means of a cord or a wire via the elongated arm and wherein the base unit is provided with sensors for measuring length or a change in length of the cord or the wire and rotation of the arm in at least one degree of freedom, and computer-controlled processing means for processing measuring signals delivered by said sensors into position data of the hand-held probe.

The spatial coordinates are understood to mean parameters defining the position in a space with respect to a reference point in either a two dimensional or three dimensional coordinate system. These parameters may be distance, azimuth angle, and elevation angle of the relevant point with respect to the reference point.

An apparatus of the above mentioned type is known from U.S. Pat. No. 6,785,973, which can be used for measuring the shape or contour of two-dimensional or three-dimensional objects, such as small objects to be placed on a measuring table, or relatively large objects disposed in a room.

The known apparatus is equipped with a cord or a wire, for connecting the movable hand-held probe to the portable base unit via an elongated arm. Therefore, only a single sensor suffices for determining the length or change in length of the cord or the wire. By using a cord or a wire, no strict limitations with regard to the length of the cord are imposed, and therefore it is possible to measure relatively large objects.

A second sensor in the apparatus is used in order to enable accurate determination of the angle or angular displacement of the cord caused by a change in position of the measuring probe. This second sensor, which is a rotation angle meter, is coupled to the rotatably supported arm in the longitudinal direction of which the cord or the wire engages the arm.

In an example, the sensors for measuring length or a change in length of the cord or the wire and rotation of the arm in at least one degree of freedom are understood to be at least one of a angle sensor, length sensor in the form of pulse generators, wherein the number of pulses delivered during use is proportional to a change in length or angular displacement of the cord or the wire or of the arm coupled thereto. Another option is to use potentiometers for measuring the rotation of the arm, and the change in length of the cord or the wire.

The computer-controlled processing means are arranged for processing the measuring signals delivered by the sensors, i.e. the angle or angular displacement of the cord and the length or change in length of the cord or the wire, into position data of the hand-held probe.

The positional accuracy of the hand-held prove of the above mentioned apparatus is determined by the sensor coupled to the rotatably supported arm and the sensor used for determining the length or change of length in the cord or wire.

It was the insight of the inventors to notice that the accuracy of the known apparatus is limited because the apparatus determines the positional data of the hand-held probe, which is not necessarily equal to the position of a desired point, for example the pointing tip of the hand-held probe. In the end, it is not the position of the hand-held probe, but for example, the position of the pointing tip of the hand-held probe which determines the accuracy of the apparatus for pointing spatial coordinates.

Consequently it is an object of the invention to provide an improved apparatus for pointing spatial coordinates, which determines the desired spatial coordinates, for example the actual position of the pointing tip of the hand-held probe.

SUMMARY

According to the invention this object has been accomplished in that said hand-held probe further comprises orientation means for determining data relating to orientation of said hand-held probe, and interface means for interfacing said orientation data to said computer-controlled processing means, and wherein said computer-controlled processing means are further arranged for processing said position data and orientation data into said spatial coordinates using said pointing tip of said hand-held probe by adjusting said position data of said hand-held probe with said orientation data of said hand-held device.

It was a further insight of the inventors that the orientation of the hand-held probe is needed in addition to the position data of the hand-held probe for determining the desired spatial coordinates, for example the actual position of the position tip. In order to accurately determine the orientation of the hand-held probe, the inventors realised that the hand-held probe should comprise orientation means for determining data relating to the orientation of the hand-held probe.

A hand-held probe according to the present invention is understood to be a device which is, in use, intended to be held by a human. For example, carried by a human when pointing spatial coordinates. The hand-held probe or device is compact enough and/of a weight such to be used or operated while being held in the hand or hands of a human.

The portable base unit is understood to mean the cabinet of the measuring apparatus having such dimensions and/or weight that a user can transport it easily, for example by one arm only. This unit is understood not to be a hand-held unit as, in use, the portable base unit is not supported by a human.

In order for the computer-controlled processing means to further include the orientation data for determining the position of the pointing tip of the hand-held probe, the hand-held probe is equipped with interface means for interfacing the orientation data from the hand-held probe to the base unit.

In an embodiment of the present invention, the interface means comprise probe communication means for communicating the orientation data to the base unit, wherein the base unit comprises base communication means for receiving the orientation data.

The inventors further noted that it is not necessary that the position of the pointing tip of the hand-held device should be determined, but, when using orientation means according to the invention, any spatial coordinate relative to the hand-held device may be determined.

For example, in the prior art, the position of the hand-held probe was determined, i.e. the position of the attachment point of the cord or wire to the hand-held device. According to the prior art, other spatial coordinates may be determined, relative to the orientation of the hand-held device, which is not necessarily the position of the pointing tip of the hand-held device. For example, the measurement point, i.e. the spatial coordinates, may be shifted or moved using optical, laser, or arithmetic means.

Imagine that the pointing tip of the hand-held device is pointing to a hollow tube. In such a case, it is possible that not the outer shell of the tube, which is appointed by the pointing tip, is the desired measuring point, i.e. the desired spatial coordinate to be measured, but the centre of the hollow tube is the desired spatial coordinate. The computer-controlled processing means may then be arranged to redirect, or shift, the measurement point to the centre of the hollow tube using the position of the pointing tip of the hand-held device.

The orientation, direction of the hand-held device, spatial orientation, and gimbal based position may be determined by the orientation means in two and/or three dimensions, for example.

In an embodiment, the orientation means comprises one or more inclinosensors for determining the orientation data of the hand-held probe. As known by a skilled person in the art, an inclinosensor is an instrument for measuring angles of slope, elevation or depression of an object with respect to gravity. Other, or equivalent instruments are a tilt meter, tilt indicator, slope alert, slope gauge, gradient meter, gradiometer, level gauge, level meter, declinometer, and pitch & roll indicator, etc. Inclinosensors may measure both inclines and declines.

In order to measure in two dimensions, at minimum one inclinosensor is needed for measuring an angle in the two dimensional plane. One inclinosensor may be arranged for measuring angle(s) in one or more planes. For example, one inclinosensor may measure angles in a three dimensional plane. In an example of the invention, one inclinosensor is used for determining the actual orientation of the hand-held in case of three-dimensional planes, i.e. the one inclinosensor may be arranged to measure in three orthogonal planes. Of course, according to the invention, the orientation means may comprise more inclinosensors, each measuring, for example, angles in different planes of a three dimensional system.

In an embodiment of the invention, the hand-held probe comprises a first part rotatably connected to a second part via a rotation angle meter, wherein the cord or the wire is connected to the second part of the hand-held probe, wherein the orientation data comprises a measured rotation angle of the rotation angle meter.

The above mentioned embodiment of the present invention provides a user with more freedom in pointing spatial coordinates. The shape of the pointing tip may, in many practical applications, differ from a standard "finger"-like shape. Sometimes, the pointing tip is equipped with a hook, corner, tilting angle, etc., for more easily pointing a spatial coordinate for a user. However, as the pointing tip does not need to be "finger"-like, the radial angle with respect to the longitudinal direction of the pointing tip is needed to determine the position of the pointing tip. This angle is measured using the rotation angle meter between the first part and the second part of the hand-held probe.

In a further embodiment of the present invention, the second part of the movable hand-held probe further comprises rotation angle indicating means for indicating the rotation angle. For example, when the apparatus is used for setting out contours of a work, the indicating means indicate to the user the radial rotation direction the user must perform to correctly position the pointing tip at a desired spatial coordinate.

In an example, these indicating means comprises several Light Emitting Diodes, LED's, disposed along side each other in a circle on the end face of the second part. Based on the LED's, a user is requested to twist, i.e. radially turn, the hand-held prove in a certain direction for pointing the desired spatial direction.

The indicating means, in a further embodiment, are arranged as an electronic display, showing the orientation and/or the position of the hand-held device.

In many practical situations, the pointing tip of the hand-held probe is interchangeable. This means that several pointing tips may be used for the hand-held probe. Of course, the base unit should know which pointing tip is currently attached to the hand-held probe for determining the actual position of the pointing tip. Whenever a user changes the pointing tip of the hand-held probe, the base unit must also be updated with the pointing tip attached.

Many options exist for updating the base unit which pointing tip is attached. For example, a user could manually enter the used pointing tip at the base unit, or the hand-held probe is equipped with certain logic which detects which pointing tip is attached and communicates this to the base unit via the interface means, for example communication means.

In another embodiment of the invention, the hand-held probe comprises a pointing device for pointing at spatial coordinates having a predetermined offset to the pointing tip of the hand-held probe for example with a laser.

In yet another embodiment of the invention, the rotatably supported elongated arm is arranged to rotate in two degrees of freedom, and wherein the sensors are arranged for measuring rotation of the arm in the two degrees of freedom.

In another embodiment of the invention, the rotation indicating means are arranged for providing guidance for pointing the hand-held probe in the form of direction information. As explained above, this type of guidance may involve a twist of the hand-held, i.e. radially turning. However, the guidance may also involve other types of assistance, like positional guidance of the hand-held itself. For example, the guidance information may indicate to the user that the hand-held should be moved to, or placed at, a different position.

In another embodiment, the direction information comprises any in the group of audio direction information, optical direction information, graphic direction information and tactile direction information.

In yet another embodiment, the hand-held probe further comprises a push button for acknowledging spatial coordinates. For example, if a user is setting out spatial coordinates, the push button assists the user for determining which spatial coordinates to set out. For instance, if the user has pointed to a first spatial coordinate, the user may push the push button so that the second spatial coordinate is provided.

Further, the computer-controlled processing means may be encompassed in the hand-held probe, the base unit or in a separate device of the apparatus for pointing spatial coordinates.

In an even further embodiment, the interface means comprise any in the group of ZIGBEE, BLUETOOTH, RF and Infrared communication means.

The above does not exclude other type of interface means which are suitable for communication between the base unit and the hand-held device. Even acoustic information, radar information or any other type of communication is incorporated in the present invention.

The invention also provides for a method for measuring spatial coordinates of an object or for setting out contours, points or works, using an apparatus comprising a movable hand-held probe, having a pointing tip, and a portable base unit provided with a rotatably supported elongated arm. The hand-held probe is connected to the portable base unit by means of a cord or a wire via the elongated arm and the base unit is provided with sensors for measuring length or a change in length of the cord or said wire and rotation of the arm in at least one degree of freedom, and with computer-controlled processing means connected to the sensors for processing measuring signals delivered by the sensors into position data of the hand-held probe.

The hand-held probe further comprises orientation means for determining orientation data of the hand-held probe, and probe communication means for communicating the orientation data to the base unit, wherein the base unit comprises base communication means for receiving the orientation data and wherein said computer-controlled processing means are further arranged for processing said received orientation data into position data of spatial coordinates using the pointing tip of the hand-held probe.

The above mentioned method is characterized in the steps of retrieving measuring signals of the sensors by the computer-controlled processing means, retrieving orientation data of the hand-held probe by the orientation means, communicating the orientation data to the base unit by the probe communication means, receiving orientation data from the hand-held probe by the base communication means, and processing the position data and the received orientation data into position data of spatial coordinates by adjusting said position data of said hand-held probe with said orientation data of said hand-held device using the pointing tip of said hand-held probe.

In another embodiment, the invention provides for a computer program product, comprising program code means stored on a computer readable medium, which computer program operates to carry out a method according to the invention, when the computer program is loaded in a working memory of a computer and is executed by the computer The above-mentioned and other features and advantages of the invention will be best understood from the following description referring to an apparatus for pointing spatial coordinates and illustrated by the attached drawings. In the drawings. Like reference numerals denote identical parts or parts performing an identical or comparable function or operation.

In the context of the present invention, means are to be understood as meaning any of a device, unit, component and element.

DETAILED DESCRIPTION

Figure 1:
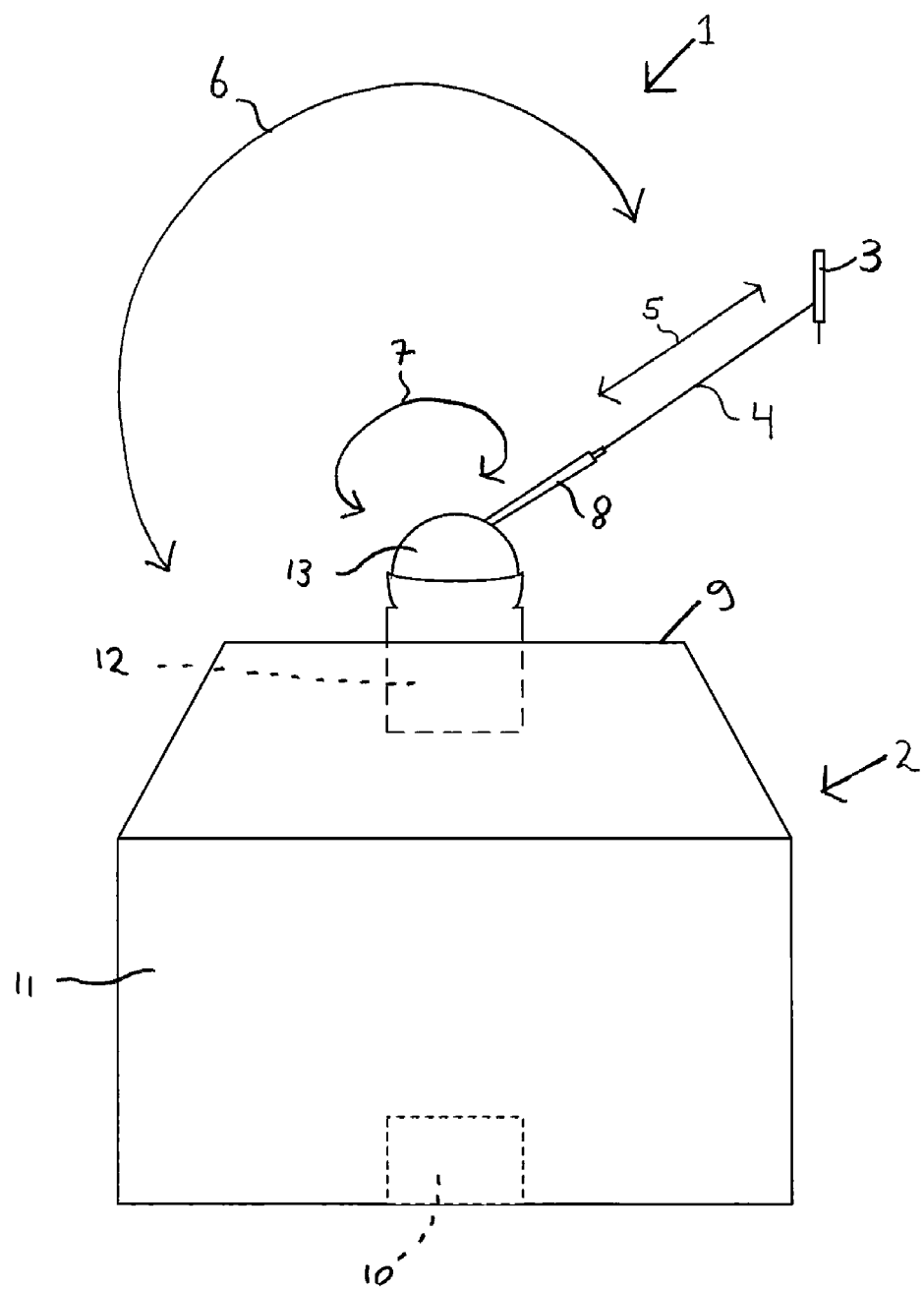
FIG. 1 is a schematic view of an apparatus for pointing spatial coordinates according to the prior art.

FIG. 1 is a schematic view of an apparatus for pointing spatial coordinates according to the prior art. To illustrate the background of the invention and to clarify the differences between the known apparatus of U.S. Pat. No. 6,785,973, which is the most relevant prior art device, a schematic side view of the latter apparatus is shown in FIG. 1. The apparatus 1 is composed of a base unit 2, which is accommodated in housing 11 that is, for example trapezoidal shaped, and a hand held prove 3. On the upper surface 9 of the housing 11 a rotatably supported arm 8 is disposed. The arm 8 is provided with a ball joint 13 at one end. Coupled to the ball joint 13 is a sensor, specifically a rotation angle meter, schematically represented by box 12, which is capable of measuring the rotation of the arm 8 in two degrees of freedom.

As indicated by means of curved arrow 7, the sensor may measure movement of the arm in an imaginary plane parallel to the upper surface 9 of housing 11, which plane may be called azimuth plane. In addition thereto and as indicated by means of curved arrow 6, the sensor may measure movement of the arm 8 in an imaginary plane perpendicular to the surface 9.

The hand held device 3 is connected to the base unit 2 by means of a cord or wire 4, which is extendable as schematically indicated by arrow 5. The base unit is provided with a tensioning and roll-up mechanism for the wire, which mechanism is schematically represented by block 22. This mechanism comprises a biased pre-set reel on which the cord or wire is wound. During measurement of, for example the contour of an object, the hand held probe 3 is directed at different locations on the object. The length or change in length of the free wire is measured by means of a sensor in the base unit 2, which sensor measures the angular displacement of the reel.

The hand held device 3 is further arranged with a pointing tip 14 for accurately pointing the spatial coordinates. As mentioned, these spatial coordinate may relate to setting out a contour of an object, or for measuring an object.

It is important that the construction of the arm 8 along with the ball joint 13 are as light-weight as possible to reduce friction. The arm 8 is therefore constructed from a light-weight material, such as aluminium or plastic. Also, the amount of material needed for constructing the arm 8 is minimized, so that the mechanical rigidity in the longitudinal direction of the arm 8 is retained and the weight of the arm 8 is reduced.

The measuring apparatus has the advantage that it can be designed as a relatively small and portable unit for measuring small objects placed on a measuring table, for example, but also for measuring larger objects that are present in a space. The measuring results obtained by means of this apparatus are not affected by environmental circumstances and parameters, such as dust, humidity, or temperature changes. The apparatus shows a high accuracy, it is user friendly, and its setup time is very short and processing of the measuring results is simple.

The present invention substantially improves the above mentioned apparatus, for example by more accurately determining the spatial coordinates the pointing tip is pointing at. According to the invention, the hand-held probe comprises orientation means for determining the orientation of the hand-held probe. The inventors noted that the orientation of the hand-held probe is required for accurately determining the position of the pointing tip.

The length or change in length of the free wire is measured by means of a sensor in the base unit, which sensor measures the angular displacement of the reel, and another sensor may measure movement of the arm in an imaginary plane parallel to the upper surface of the housing, which results in an accurate determination of the position of the attachment point of the wire to the hand-held device.

It is the insight of the inventors that an even more accurate position of the pointing tip may be determined by adjusting the position of the attachment point of the wire to the hand-held device with the orientation data of the hand-held device.

Of course, the type of pointing tip used must be included in the determination of the actual position of the free end of the pointing tip.

Figure 2:
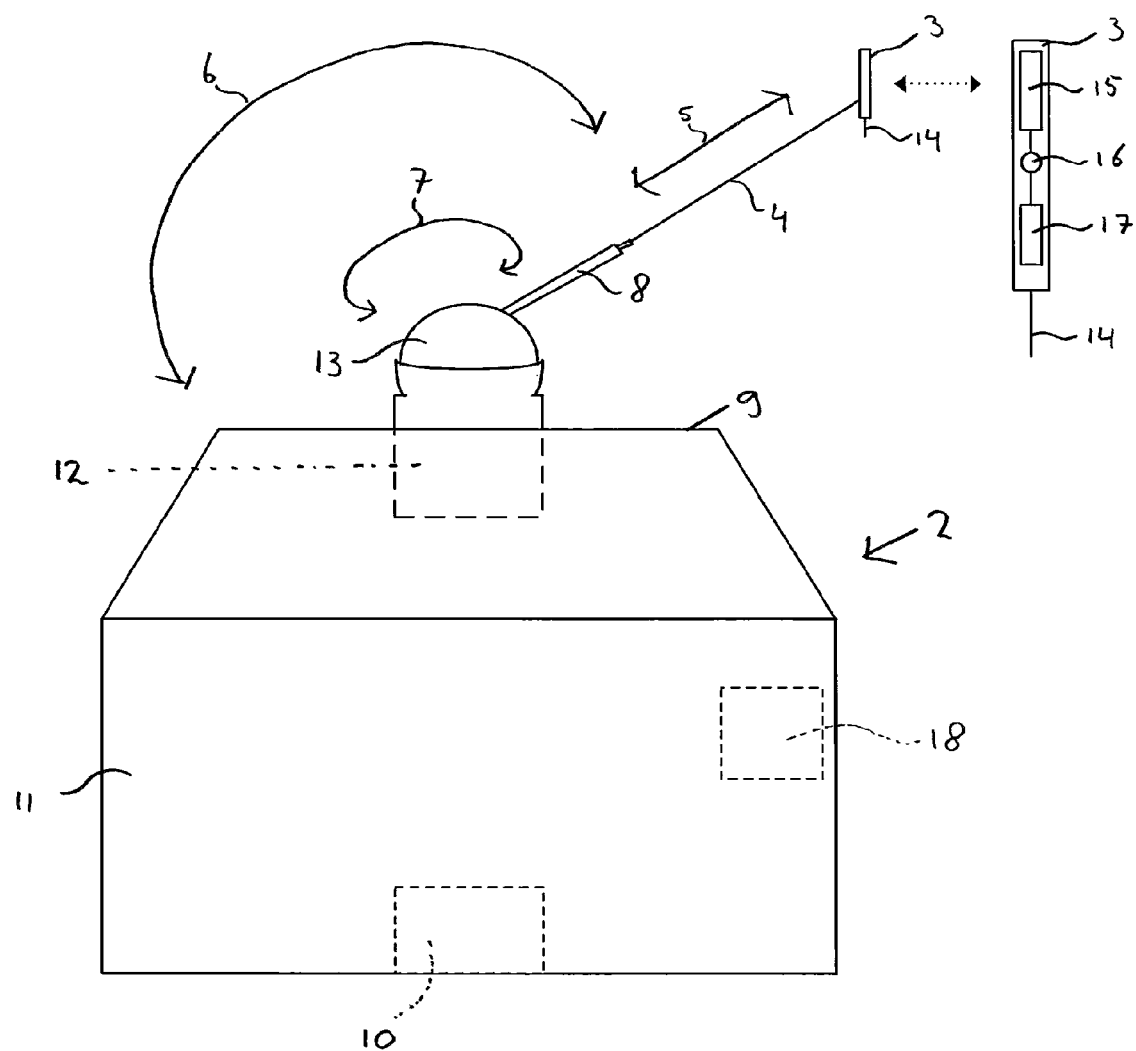
FIG. 2 is a schematic view of an apparatus for pointing spatial coordinates according to the present invention.

FIG. 2 is a schematic view of an apparatus for pointing spatial coordinates according to the present invention. Here, the hand-held device 3 is further arranged with orientation means 17 for determining orientation data of the hand-held probe 3. In an example according to the invention the orientation data comprises data relating to the orientation of the hand-held probe 3. This data is then communicated to the base 2 unit via interface means, i.e. communication means 15 in the hand-held probe 3 and base communication means 18 in the base unit 2.

In such a case, it is necessary for the computer-controlled processing means to know which pointing tip 14 is attached to the hand-held probe 3. Based on the actual pointing tip 14 used, the computer-controlled processing means can determine the actual position data of the pointing tip 14 of the hand-held probe 3, which is more accurate compared to the position data of the attachment point of the cord 4 to the hand-held probe 3.

Which pointing tip 14 is attached to the hand-held probe 3 may be provided by a user to the base unit 2 directly. For example, every time a user changes the pointing tip 14 of the hand-held probe 3, the user should confirm the use of a different pointing tip 14 to the base unit 2. In other words, the user should inform the base unit 3 which pointing tip 14 is currently attached to the hand-held probe 3.

In another example, a user may provide the hand-held probe 3 with information on which pointing tip 14 is attached to the hand-held probe 3. In such a case, the data, which is communicated from the hand-held probe 3 to the base unit 2, comprises this type of information. The base unit 2 is then arranged to communicate the information to the computer-controlled processing means 18 for determining the position data of the pointing tip 14 of the hand-held probe 3.

In an even further example, the hand-held probe 3 is automatically aware which pointing tip 14 is attached, due to properties of the pointing tip 14 and the hand-held probe. For example, every pointing tip 14 may be arranged to mechanically connect slightly different to the hand-held probe 14. In such a case, the hand-held probe 3 is aware which pointing tip is attached due to the type of connection of the pointing tip 14 to the hand-held probe. The type of pointing tip 14 may also be automatically communicated to the hand-held probe 3 by means of, for example, RFID.

The hand-held prove 3 is further arranged with a push button 16 for acknowledging spatial coordinates. For example, whenever a user is trying to record coordinates in a three-dimensional plane, the user may acknowledge a spatial coordinate by pressing the push button 16. The communication means 15 of the hand-held probe 3 transmit the data relating to the orientation of the hand-held probe 3 at the moment the push button 16 was pressed to the base unit 2.

In such a case, the base unit 2 is arranged to construe a map of the three-dimensional environment, which may be used to determine the dimensions of a window frame, for example.

Several implementation exist for implementing the communication means 15 of the hand-held probe 3 and the base communication means 18 of the base unit 2. One of the possible solutions is to use ZIGBEE communications, as ZIGBEE is known as a low-power, robust communication protocol. As the hand-held probe 3 needs to be arranged with a battery, the inventors realised that a low-power communication protocol is desired for increasing the life time/battery time.

Of course, as a skilled person in the art realizes, other solutions for implementing the actual communications between the hand-held probe 3 and the base unit 2 exist, for example, blue-tooth and/or RF. In en even more detailed embodiment, the interface means are not arranged as a wireless communication tool, but communication between the hand-held probe 3 and the base unit 2 is performed using the cord 4, or a separate cord, between the hand-held probe 3 and the base unit 2. The cord 4 may, for example, be equipped to transfer electronic signals from and to the hand-held probe 3.

Figure 3:
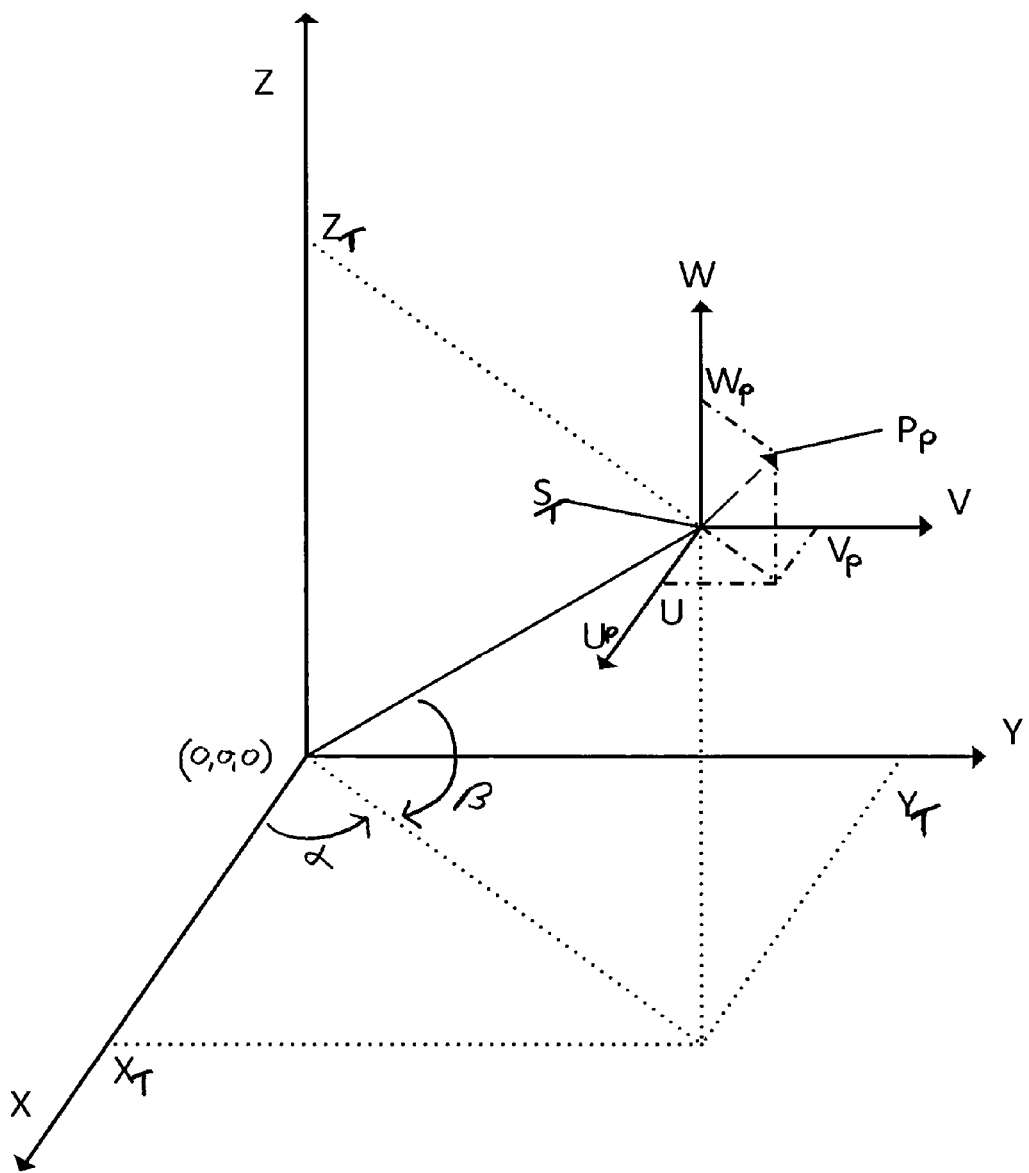
FIG. 3 is a schematic view of a three dimensional plane in which the additional accuracy by incorporating the orientation means is shown.

FIG. 3 is a schematic view of a three dimensional plane in which the additional accuracy by incorporating the orientation means is shown. Schematically the position of the pointing tip is indicated with reference numeral $P_p$, indicated with additional components $U_p$, $V_p$ and $W_p$, and the position where the cord is attached to the hand-held device is indicated with reference numeral $S_t$, indicated with components $X_t$, $Y_t$ and $Z_t$.

FIG. 3 shows a three dimensional coordinate system (X,Y, Z) referenced to the base unit. The base unit may be seen as placed in the intersection of the X-axis, Y-axis and the Z-axis, referenced with (0,0,0).

The apparatus for measuring spatial coordinates according to the prior art is arranged to determine the coordinates of the point of attachment, i.e. the position in which the cord or wire is attached to the hand-held device. This point is indicated with $S_t$, with components $X_t$, $Y_t$ and $Z_t$. Here, the prior art apparatus is arranged to determine the azimuth and the inclination angle, $\alpha$ and $\beta$ for determining in which direction, with reference to the base unit, the hand-held device is positioned. Further, the prior art apparatus is arranged to determine the length of the cord or wire, i.e. the length of the line between point (0,0,0) and point $S_t$, and provides the position of the hand-held device based on these angular and length measurements.

As mentioned before, and as is clearly shown in FIG. 3, the position of the point in which the cord or wire is attached to the hand-held device is not equal to the position of the pointing tip. It was the insight of the inventors that the position of the attachment point should be corrected for the orientation of the hand-held device, so that the position of the pointing tip may be calculated.

In order to determine the orientation of the hand-held device, the inventors realized that the hand-held device needs to be equipped with orientation means, for example an inclinosensor. In this case, the hand-held device must be arranged with at least one inclinosensor to measure the orientation of the hand-held device in three dimensions. In order for more accuracy, the hand-held device may be arranged with more than one inclinosensor.

The orientation means are arranged to determine the orientation of the hand-held device. The orientation of the hand-held device In addition to the position of the position of the attachment point provides sufficient information to determine the position of the pointing tip.

In a first aspect the orientation means may provide data relating to the orientation of the hand-held device. This data could comprise, for example, the actual orientation of the hand-held device with reference to the force of gravity. In another aspect, the orientation means are arranged for determining the correction factor which is needed to determine the position of the pointing tip. In such a case, the interface means of the hand-held device may be arranged to communicate the actual correction factor concerning the relative position of the pointing tip to the base unit. The base unit is then arranged for updating the position of the point of attachment with the correction data received from the hand-held device.

Figure 4:
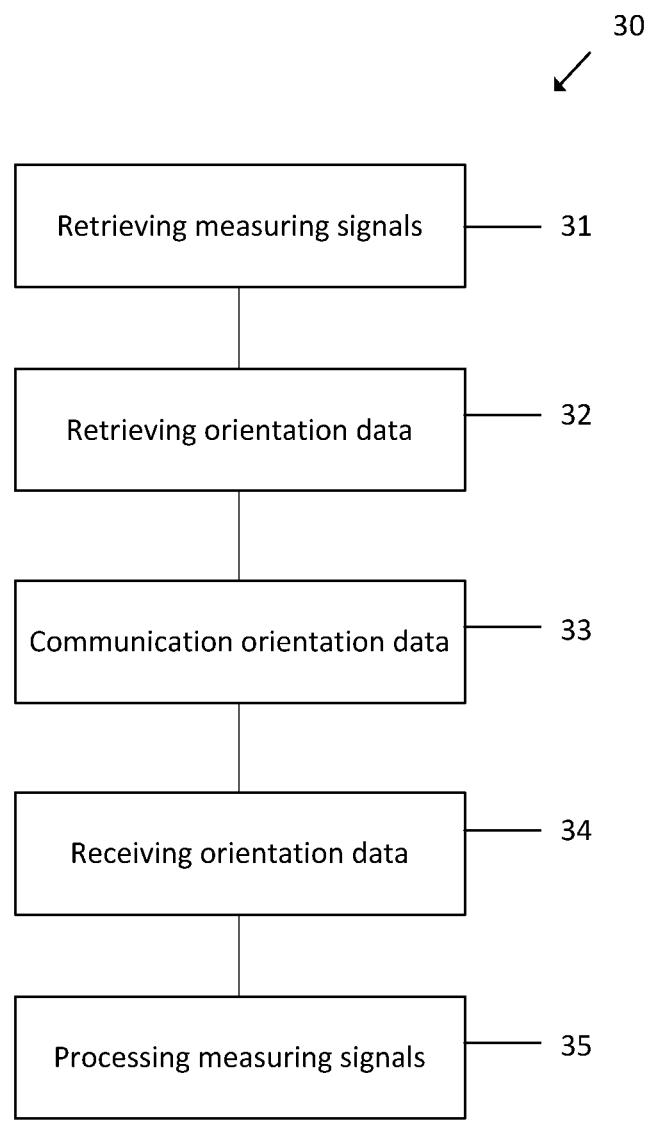
FIG. 4 is a schematic view of a method for measuring spatial coordinates according to the present invention.

FIG. 4 is a schematic view of a method 30 for measuring spatial coordinates according to the present invention.

The method is characterised in the steps of retrieving 31 measuring signals of the sensors by the computer-controlled processing means, retrieving 32 data relating to orientation of the hand-held probe by the orientation means, communicating 33 the orientation data to the base unit by the probe communication means, receiving 34 orientation data from the hand-held probe by the base communication means, and processing 35 the measuring signals and the received orientation data into position data of spatial coordinates using the pointing tip of the hand-held probe.

Figure 5:
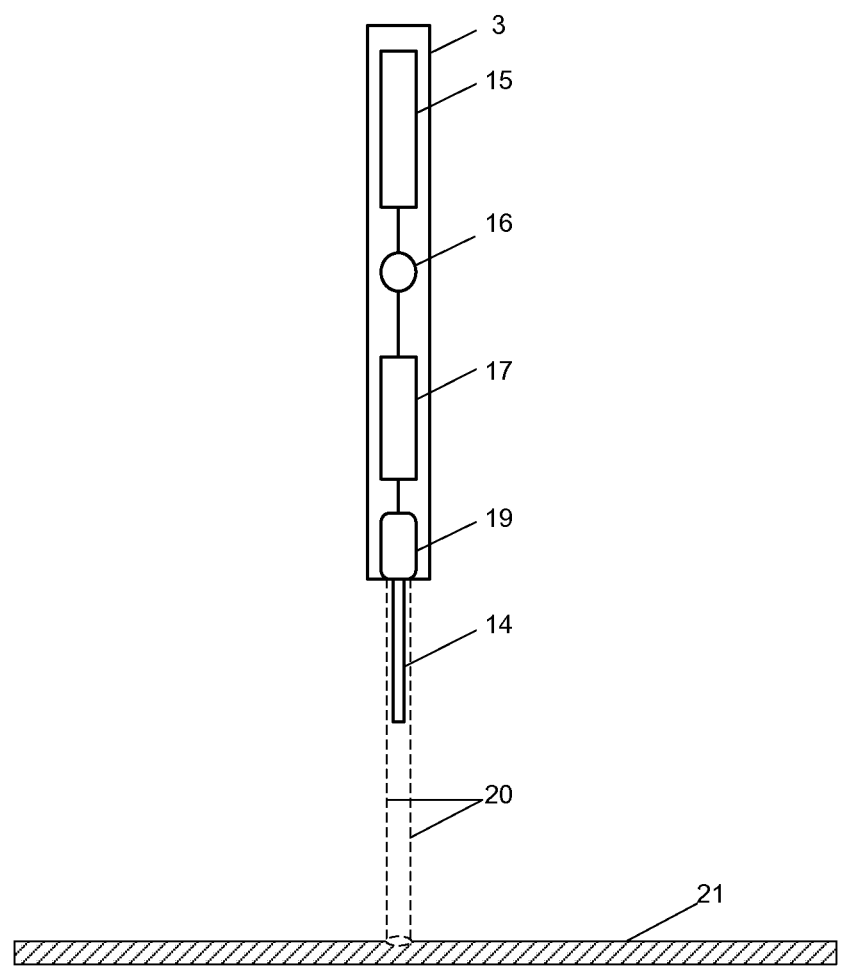
FIG. 5 is a schematic view of a hand-held probe for use with an apparatus for pointing spatial coordinates according to the present invention.

FIG. 5 is a schematic view of a hand-held probe 3 for use with an apparatus for pointing spatial coordinates according to the present invention. Here, in addition to the hand-held probe shown along with FIG. 2, the hand-held probe 3 comprises a laser 19, for pointing at spatial coordinates having a predetermined offset to the pointing tip of the hand-held probe. The laser 19 provides a laser beam 20, directed to a plate 21, for accurately pointing at said plate 21, for example a cutting place for cutting the plate 21.

Although the invention has been explained in the foregoing by means of exemplary embodiments of the apparatus for measuring spatial coordinates, it will be appreciated that the inventive concept can be realised in several ways within the scope of the appending claims.

The invention claimed is:

1. An apparatus for pointing spatial coordinates by a pointing tip, comprising a movable hand-held probe, having said pointing tip, and a portable base unit provided with a rotatably supported elongated arm, wherein said hand-held probe connects to said portable base unit by means of a cord or a wire via said elongated arm and wherein said base unit is provided with sensors arranged for measuring length or a change in length of said cord or said wire and rotation of said arm in at least one degree of freedom, and a computer-controlled processing device arranged for processing measuring signals delivered by said sensors into position data of said hand-held probe, characterized in that said hand-held probe further comprises an orientation device arranged for determining orientation data of said hand-held probe, and an interface device arranged for exchanging said orientation data with said computer-controlled processing device, and wherein said computer-controlled processing device is further arranged for processing said position data and orientation data into said spatial coordinates of said pointing tip of said hand-held probe by adjusting said position data of said hand-held probe with said orientation data of said hand-held device.

2. Apparatus according to claim 1, wherein said movable hand-held probe comprises a first part rotatably connected to a second part via a rotation angle meter, wherein said cord or said wire is connected to said second part of said hand-held probe, wherein said orientation data comprises a measured rotation angle of said rotation angle meter.

3. Apparatus according to claim 2, wherein said second part of said movable hand-held probe further comprises a rotation angle indicating device for indicating said rotation angle.

4. Apparatus according to claim 3, wherein said hand-held probe further comprises a position indicating device for indicating said position data of said pointing tip of said hand-held probe, received via said interface device from said computer-controlled processing device.

5. Apparatus according to claim 4, wherein said position indicating device and said rotation indicating device are further arranged for providing guidance for pointing said hand-held probe in the form of direction information.

6. Apparatus according to claim 5, wherein said direction information comprises any in the group of audio direction information, optical direction information, graphic direction information and tactile direction information.

7. Apparatus according to claim 1, wherein said hand-held probe comprises a pointing device for pointing at spatial coordinates having a predetermined offset to said pointing tip of said hand-held probe.

8. Apparatus according claim 7, wherein said pointing device comprises a laser.

9. Apparatus according to claim 1, wherein said rotatably supported elongated arm is arranged to rotate in two degrees of freedom, and wherein said sensors are arranged for measuring rotation of said arm in said two degrees of freedom.

10. Apparatus according to claim 1, wherein said orientation device comprise at least one inclinosensor for determining orientation of said movable hand-held probe for exchanging with said base unit.

11. Apparatus according to claim 10 wherein said at least one inclinosensor is arranged for measuring an elevated angle in different planes of a three dimensional coordinate system.

12. Apparatus according to claim 1, wherein said hand-held probe is suitable for use with different types of pointing tips, and wherein said orientation device is arranged for determining said orientation data based on a type of tip used with said hand-held probe.

13. Apparatus according to claim 12, wherein said hand-held probe further comprises a push button for acknowledging spatial coordinates.

14. Apparatus according to claim 1, wherein said interface device comprise any in the group of wireless communication devices arranged for utilizing ZIGBEE, BLUETOOTH, RF and Infrared interfacing.

15. A method for pointing spatial co-ordinates by a pointing tip using an apparatus comprising a movable hand-held probe, having said pointing tip, and a portable base unit provided with a rotatably supported elongated arm, wherein said hand-held probe is connected to said portable base unit by means of a cord or a wire via said elongated arm and wherein said base unit is provided with sensors arranged for measuring length or a change in length of said cord or said wire and rotation of said arm in at least one degree of freedom, and with a computer-controlled processing device connected to said sensors for processing measuring signals delivered by said sensors into position data of said hand-held probe, wherein said hand-held probe further comprises an orientation device for determining orientation data of said hand-held probe, and an interfacing device for exchanging said orientation data with said computer-controlled processing device, wherein said computer-controlled processing device is further arranged for processing said received orientation data into position data of spatial coordinates of said pointing tip of said hand-held probe, characterized in the steps of:

retrieving measuring signals of said sensors by said computer-controlled processing device;

retrieving data relating to orientation of said hand-held probe by said orientation device;

exchanging said orientation data to said computer-controlled processing device by said interfacing device;

processing said position data and said received orientation data into position data of spatial coordinates at said pointing tip of said hand-held probe by adjusting said position data of said hand-held probe with said orientation data of said hand-held device.

16. A method according to claim 15, wherein said movable hand-held probe comprises a first part rotatably connected to a second part via a rotation angle meter, wherein said cord or said wire is connected to said second part of said hand-held probe, and wherein said step of retrieving orientation data of said hand-held probe comprises measuring of a rotation angle between said first part and said second part.

17. A method according to claim 16, wherein said step of retrieving orientation data of said hand-held probe comprises measuring of elevated angles in at least two independent planes of a three dimensional coordinate system.

18. A computer program product, comprising program code means stored on a computer readable medium, which computer program operates to carry out the method according to claim 15, when said computer program is loaded in a working memory of a computer and is executed by said computer.

* * * * *